United States Patent [19]

Zirngibl

[11] 3,979,429

[45] Sept. 7, 1976

[54] PARA-AMINO-β-CYANO-BIS-STYRYL COMPOUNDS

[75] Inventor: Ulrich Zirngibl, Oberwil, Switzerland

[73] Assignee: Sandoz Ltd., Basel, Switzerland

[22] Filed: May 8, 1975

[21] Appl. No.: 575,617

[30] Foreign Application Priority Data

May 14, 1974 Switzerland.......................... 6581/74

[52] U.S. Cl.................................... 260/463; 8/54.2; 8/179; 260/268 C; 260/268 CN; 260/268 S; 260/456 A; 260/465 D; 260/465 E
[51] Int. Cl.²............... C07C 121/78; C07C 143/68; C07D 295/00
[58] Field of Search............ 260/465 D, 465 E, 463, 260/456 A, 268 C, 268 S, 268 CN

[56] References Cited

UNITED STATES PATENTS

| | | | |
|---|---|---|---|
| 3,386,491 | 6/1968 | Weaver et al................... | 260/465 X |
| 3,504,010 | 3/1970 | Straley et al........................ | 260/465 |
| 3,546,270 | 12/1970 | Kirchmayr et al.................. | 260/465 |
| 3,597,434 | 8/1971 | Weaver.......................... | 260/465 X |

*Primary Examiner*—Lewis Gotts
*Assistant Examiner*—Dolph H. Torrence
*Attorney, Agent, or Firm*—Gerald D. Sharkin; Richard E. Vila; Thomas C. Doyle

[57] ABSTRACT

The present invention relates to para-substituted-amino-β,β-dicyano- or β-cyano-,β-acyl-distyryl disperse dyes in which the benzene nuclei of the two styryl radicals are connected by a bridge member.

24 Claims, No Drawings

PARA-AMINO-β-CYANO-BIS-STYRYL COMPOUNDS

The present invention relates to styryl compounds, their production and use.

Accordingly, the present invention provides para-substituted-amino-β,β-dicyano or β-cyano-β-acyl-distyryl disperse dyes in which the benzene nuclei of the two styryl radicals are connected by a bridge member, which benzene nuclei may be further substituted by substituents which do not deleteriously affect the dyeing properties of the styryl compounds. Acyl is to be understood according to the definition hereinafter given.

In particular, the present invention provides compounds of formula I,

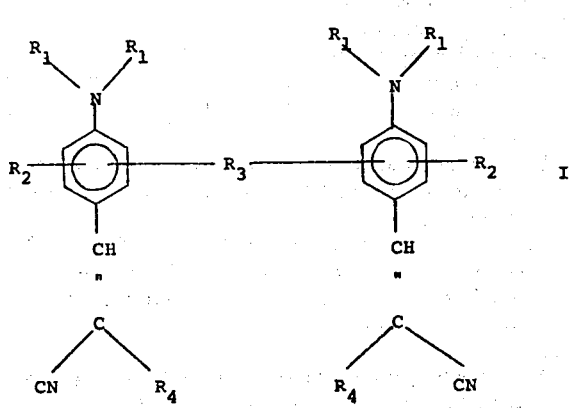

in which each
R$_1$, independently, signifies (C$_{1-6}$) alkyl which is unsubstituted or monosubstituted by halogen, cyano, hydroxyl, alkoxy, phenyl, phenoxy or acyloxy,
each
R$_2$, independently, signifies hydrogen, halogen, (C$_{1-6}$) alkyl or (C$_{1-6}$) alkoxy,
R$_3$ signifies a divalent radical of formula —R$_5$—R$_7$—R$_5$—R$_7$—R$_6$—R$_7$—R$_5$—R$_7$—R$_5$— or —R$_5$—R$_7$—R$_6$—R$_7$—R$_5$—
in which R$_6$ signifies a direct bond or a divalent radical of formula —O—, —S—, —NR$_9$—, —CO—, —O—CO—, —O—CO—O—, —SO$_2$—, —NR$_8$—CO—NR$_8$— or —NR$_8$—SO$_2$—NR$_8$,
R$_4$ signifies cyano or acyl,
each
R$_5$, independently, signifies a divalent radical of formula —NR$_8$—CO—, —NR$_8$—CO—O—, —O—SO$_2$—, —NR$_8$—SO$_2$—, —O—SO$_2$—NR$_8$— or has one of the significances given for R$_6$, any unsymmetrical divalent radical as R$_5$ and R$_6$ being linked either way round,
each
R$_7$, independently, signifies (C$_{1-6}$) alkylene or alkylidene of up to 6 carbon atoms which alkylene and alkylidene radicals are unsubstituted or monosubstituted by halogen, cyano, hydroxyl, (C$_{1-6}$) alkoxy, phenyl, phenoxy or acyloxy,
each R$_8$, independently, signifies hydrogen, (C$_{1-6}$) alkyl or, when the chain contains any two R$_8$ attached to nitrogen atoms which are joined by an ethylene radical as R$_7$, the two symbols R$_8$, together with the nitrogen atoms and R$_7$ may join to form a piperazine ring, and
R$_9$ signifies (C$_{1-6}$) alkylcarbonyl or (C$_{1-6}$) alkoxycarbonyl,
which molecule is free from acetal groups.

By 'acyl' is to be understood a group of formula R — Y or R' — Z,
in which
R signifies (C$_{1-6}$) alkyl,
Y signifies —O—CO—, —SO$_2$— or —O—SO$_2$—,
R' signifies hydrogen or (C$_{1-6}$) alkyl and
Z signifies —CO—, —NR''—CO— or —NR'—SO$_2$— in which R'' has one of the significances of R', Acyloxy is to be understood accordingly.

By halogen is to be understood chlorine, bromine or fluorine, especially chlorine or bromine.

Any aliphatic radical in the molecule may be straight chain or branched, unless otherwise stated.

The present invention also provides a process for the production of para-substituted-amino-β,β-dicyano or β-acyl, β-cyano-di-styryl disperse dyes in which the benzene nuclei of the two styryl radicals are linked by a bridge member, comprising condensing the corresponding di-benzaldehyde or other suitable derivative with malonic acid dinitrile or a mono-acyl derivative thereof, preferably in a 1:2 molar ratio. For example, the compounds of formula I, as defined above, can be prepared by condensing a compound of formula II,

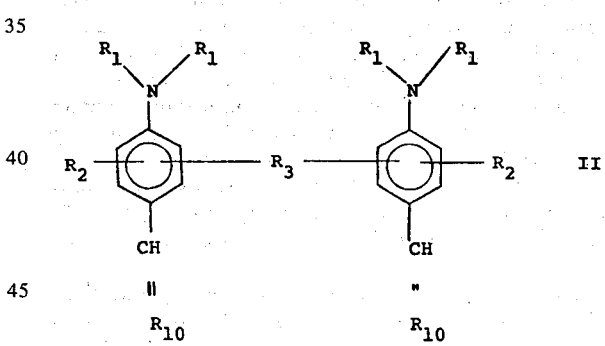

in which
R$_1$, R$_2$ and R$_3$ are as defined above, and
R$_{10}$ signifies oxygen, sulphur, =NR$_{19}$, =NR$_{19}$R$_{18}$ or two similar or different radicals selected from the group consisting of chlorine, bromine or —OR$_{19}$,
in which
R$_{18}$ signifies acyl as hereinbefore defined, or unsubstituted or substituted (C$_{1-6}$) alkyl or phenyl, and
R$_{19}$ signifies hydrogen or has one of the significances given for R$_{18}$,
with a compound of formula III,

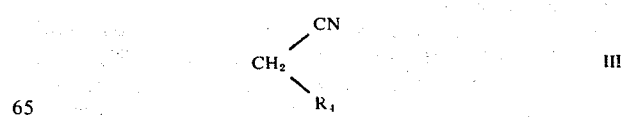

in which R₄ is as defined above.

The condensation reaction may be carried out according to known methods e.g. under Knoevenagel conditions. For example, the reaction may be conducted in an inert, protic, preferably anhydrous, solvent e.g. methanol or ethanol, in the presence of an organic base. Suitable reaction temperatures are between 50° and 150°C, preferably at the boiling temperature of the solvent employed. Examples of suitable organic bases are piperidine, pyrrolidone, pyridine and triethylamine. The product generally precipitates during the reaction or upon cooling. If not, the product may be isolated by concentrating, cooling and filtering.

Preferred compounds of formula II, are those wherein R₁₀ signifies oxygen or

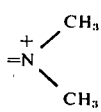

In the compounds of formula I, any alkyl radical as R₁ preferably contains 1 to 4 carbon atoms. Any acyloxy substituent on an alkyl radical as R₁ is preferably (C₁₋₄) alkylcarbonyloxy or (C₁₋₄) alkoxycarbonyloxy. Preferably each R₁, independently, signifies (C₁₋₄) alkyl or (C₁₋₄) alkyl monosubstituted by chlorine, bromine, hydroxy, (C₁₋₄) alkoxy, (C₁₋₄) alkylcarbonyloxy or (C₁₋₄) alkoxycarbonyloxy, more preferably, (C₂₋₄) alkyl (especially ethyl) which is unsubstituted or monosubstituted by alkoxy (especially methoxy) or halogen (especially chlorine). Most preferably, R₁ signifies an unsubstituted (C₂₋₄) alkyl radical, especially ethyl.

Any alkyl or alkoxy radical as R₂ preferably contains 1 to 4 carbon atoms, more preferably 1 carbon atom. Any halogen as R₂ is preferably chlorine.

Each R₂, independently, preferably signifies hydrogen or (C₁₋₄) alkyl especially methyl. More preferably the R₂'s are identical. Most preferably each R₂ signifies hydrogen.

In the bridge member R₃, R₆ preferably signifies a direct bond or a divalent radical of formula —O—, —S—, —NR₉'—, —O—CO— or —O—CO—O— in which R₉' signifies (C₁₋₄) alkylcarbonyl or (C₁₋₄) alkoxycarbonyl. Each R₅' independently, preferably signifies one of the preferred significances given for R₆ or NR₈' CO—, —NR₈' CO—O—, —O—SO₂—, —NR₈' SO₂— or —O—SO₂—NR₈' in which each R₈', independently, signifies hydrogen or (C₁₋₄) alkyl or any two symbols R₈', when attached to nitrogen atoms connected by an ethylene radical as R₇, together with the nitrogen atoms and the ethylene radical form a piperazine ring. Any substituted alkylene or alkylidene radical as R₇ is preferably mono-substituted by hydroxy, chlorine, bromine, (C₁₋₄) alkoxy or (C₁₋₄) alkylcarbonyloxy. Preferably, R₇ is an unsubstituted alkylene or alkylidene.

Preferably the bridge member R₃ signifies a radical of formula —R₁₃—R₁₅—R₁₄—R₁₅—R₁₃— or —R₁₆—R₁₄—R₁₆— in which each R₁₃, independently, signifies an alkylene radical of up to 6 carbon atoms, R₁₄ signifies an alkylene radical of 2 to 6 carbon atoms or an alkylene radical of 2 to 6 carbon atoms containing an ether linkage, each R₁₅, independently signifies —O—, —O—CO—, —O—CO—O—, —CO—NR₁₇— or —O—CO—NR₁₇—, in which R₁₇ signifies hydrogen or (C₁₋₂) alkyl, each R₁₆, independently, signifies one of the significances given for R₁₅ or signifies —O—SO₂—, —NR₁₇—SO₂— or —O—SO₂—NR₁₇— in which R₁₇ is as defined above, any unsymmetrical divalent radical as R₁₅ or R₁₆ being bonded either way round. Preferably each of the two symbols R₁₃, R₁₅ and R₁₆ are the same.

The bridge group R₃ is preferably bonded in a position ortho to the methine group on each benzene nucleus.

Any acyl radical as R₄ is preferably (C₁₋₆) alkoxycarbonyl. Preferably, R₄ signifies cyano or (C₁₋₄) alkoxycarbonyl, especially cyano.

Preferred compounds of formula I are those in which each
R₁, independently, signifies (C₁₋₄) alkyl or (C₁₋₄) alkyl monosubstituted by chlorine, bromine, hydroxy, (C₁₋₄) alkoxy, (C₁₋₄) alkylcarbonyloxy or (C₁₋₄) alkoxycarbonyloxy,
R₂ signifies hydrogen or (C₁₋₄) alkyl,
R₃ signifies —R₅', —R₇', —R₅', —R₇', —R₆', —R₇', —R₅', —R₇', —R₅', — or R₅', —R₇', —R₆', —R₇', —R₅', —
R₄ signifies cyano or (C₁₋₄) alkoxycarbonyl, methoxy- and ethoxycarbonyl being the preferred alkoxycarbonyls,
R₆' signifies a direct bond or —O—, —S—, —NR₉'—, —O—CO— or —O—CO—O— in which R₉ signifies (C₁₋₄) alkylcarbonyl, or (C₁₋₄) alkoxycarbonyl,
each
R₅', independently, signifies one of the significances given for R₆' or signifies —NR₈ —CO—, NR₈ —CO—O—, —O—SO₂—, NR₈ — SO₂— or —O—SO₂—NR₈' —
in which each R₈', independently, signifies hydrogen or (C₁₋₄) alkyl or any two symbols R₈', when attached to nitrogen atoms connected by an ethylene radical as R₇', together with the nitrogen atoms and an ethylene radical as R₇' form a piperazine ring, and
each
R₇', independently, signifies an alkylene or alkylidene radical which is unsubstituted or monosubstituted by hydroxy, chlorine, bromine, (C₁₋₄) alkoxy, or (C₁₋₄) alkylcarbonyloxy,
with the compounds where the bridge member R₃ is symmetrical, being more preferred and especially those compounds where R₃ is symmetrical and R₆ is a direct bond.

Even more preferred compounds of formula I, are those of formula Ia,

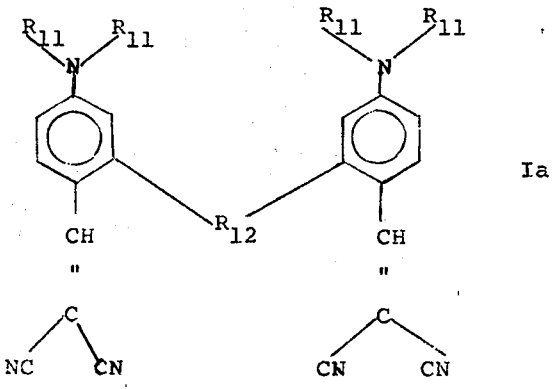

in which the symbols $R_{11}$ are the same and signify ($C_{2-4}$) alkyl, especially ethyl, and $R_{12}$ signifies $—R_{13}—R_{15}—R_{14}—R_{15}—R_{13}—$ or $—R_{16}—R_{14}—R_{16}—$ in which $R_{13}$ to $R_{16}$ are as defined above.

Especially interesting compounds are compounds of formula I and Ia in which $R_1$ or $R_{11}$ signify ethyl,
$R_2$ signifies hydrogen
$R_3$ or $R_{12}$ signifies a 5 to 12 membered chain and
$R_4$ signifies cyano and $R_3$ or $R_{12}$ is bound in an ortho position to the methine group.

The compounds of formula II may be produced by known methods, for example by condensing a 3-N,N-dialkylamino-1-(hydroxyalkyl)-benzene, -phenol or -thiophenol or a corresponding benzoic or benzene sulphonic acid with an appropriate dicarboxylic acid or

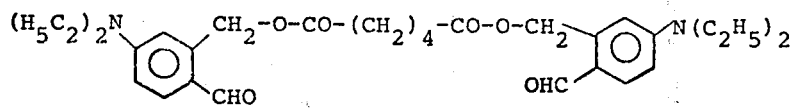

disulphonic acid dichloride or dihydroxy compound in a 2:1 molar ratio, with subsequent aldehyde synthesis by the Vilsmeyer process.

The compounds according to the invention may be converted into dyeing preparations by known methods, for example, by grinding in the presence of dispersing agents and/or fillers with subsequent vacuum or spray drying. The preparations may be used as such or may be used after the addition of water, for exhaust dyeing, pad dyeing or printing substrates consisting of or comprising synthetic or semi-synthetic hydrophobic, high molecular weight substances in a long or short bath. The di-styryl compounds according to the invention are especially suitable for dyeing or printing substrates consisting of or comprising linear, aromatic polyesters or cellulose triacetate. The substrate may be in loose fibre, yarn or fabric form.

Conventional dyeing methods may be used.

The dyes build-up well and exhibit notable fastness to light, thermofixation, sublimation and pleating.

The following Examples further serve to illustrate the invention. In the Examples all parts and percentages are by weight and all temperatures in degrees Centigrade.

EXAMPLE 1

13 Parts of adipic acid dichloride are added over the course of one hour with stirring at 0°–5° to 25 parts of 3-N,N-diethylaminobenzyl alcohol, 18 parts of ethyldiisopropyl-amine and 90 parts of diethyl ether. Stirring is continued at 0°–5° for a further hour, and at room temperature for 20 hours. The mixture is then filtered from the separated hydrochloride. The filtrate is concentrated to constant weight and the oily residue is absorbed in 50 parts of benzene and purified in a short column of $SiO_2$.

3.4 Parts of phosphorus oxychloride are allowed to flow slowly into 9.5 parts of dimethyl formamide with stirring. The mixture is stirred for one hour at 40° and 4.8 parts of the adipic acid-bis-(3-diethylamino)-benzylester, produced and purified as described above, mixed with 2 parts of dimethyl formamide, are added to the solution over the course of 35 minutes, and the mixture is stirred for 4 hours at 60°–65°.

A mixture consisting of 90 parts of diethylether, 150 parts of water and 11 parts of $NaHCO_3$, is added until hydrolysis takes place and the reaction mixture is stirred intensively, whereby the dialdehyde of formula is precipitated as a flakey deposit. The product is filtered off, washed once with diethylether, three times with water and dried.

2 Parts of dialdehyde and 0.6 parts of malonic acid dinitrile are dissolved at 65° in 16 parts of anhydrous ethanol. 0.1 Parts of piperidine are added thereto and the reaction mixture is boiled for 2 hours at reflux, cooled, the deposit filtered off, washed with ice-cold methanol and dried. The dyestuff of formula

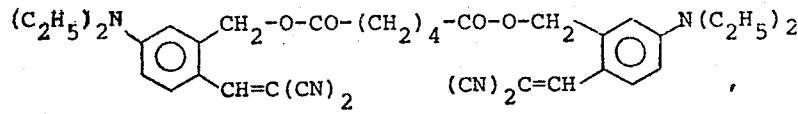

thus obtained, dyes polyester fibre material in greenish-yellow shades with notable fastness properties.

In the following table further dyestuffs of formula

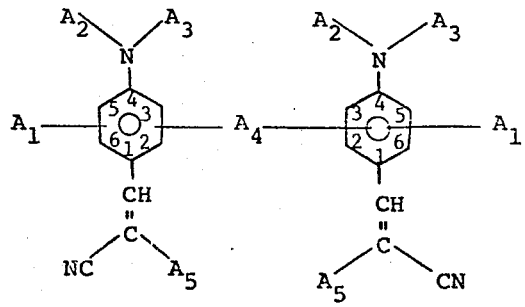

are given which are produced in accordance with the above example and which dye all polyester fibre materials in greenish-yellow shades with notable fastness.

TABLE

| Example No. | $A_1$ | $A_2$ | $A_3$ | $A_4$ | $A_5$ |
|---|---|---|---|---|---|
| 2 | H | $—C_2H_5$ | $—C_2H_5$ | 2-$CH_2O—CO—(CH_2)_4—CO—OCH_2$-2 | $—CO—O—C_2H_5$ |
| 3 | H | '' | '' | 2-$CH_2O—CO—(CH_2)_2—CO—OCH_2$-2 | $—CN$ |
| 4 | H | '' | '' |  | $—COOCH_3$ |
| 5 | H | '' | '' | 2-$CH_2O—CO—O(CH_2)_2O—CO—O—CH_2$-2 | $—CN$ |
| 6 | H | n-$C_4H_9$ | '' | 2-$CH_2O—CO(CH_2)_4—CO—OCH_2$-2 | '' |
| 7 | H | '' | n-$C_4H_9$ | '' | $—COOC_2H_5$ |
| 8 | H | $—C_2H_5$ | $—C_2H_5$ | 2-$CH_2O—CO—CH_2OCH_2—CO—OCH_2$-2 | $—CN$ |
| 9 | H | '' | '' | 2-$CH_2OCH_2CH_2O—CO—OCH_2CH_2OCH_2$-2 | '' |
| 10 | H | '' | '' |  | $—COOC_2H_5$ |

TABLE-continued

| Example No. | $A_1$ | $A_2$ | $A_3$ | $A_4$ | $A_5$ |
|---|---|---|---|---|---|
| 11 | H | " | " | " | —$COCH_3$ |
| 12 | H | " | " | 2-$CH_2S(CH_2)_3SCH_2$—2 | —CN |
| 13 | H | " | " | " | —$COOCH_3$ |
| 14 | H | " | " | 2-$CH_2$—CO—O$(CH_2)_4$O—CO—$CH_2$—2 | —CN |
| 15 | H | " | " | 2-$CH_2$O—CO—N⌬N—CO—O$CH_2$—2 | " |
| 16 | H | " | " | 2-$CH_2$N$(C_2H_5)$—CO—$(CH_2)_4$—CO—N$(C_2H_5)CH_2$—2 | " |
| 17 | H | —$C_2H_5$ | —$C_2H_5$ | 2-$CH_2$N$(C_2H_5)$—CO—$(CH_2)_4$—CO—N$(C_2H_5)CH_2$—2 | —$COC(CH_3)_3$ |
| 18 | H | " | " | 2-$CH_2$O—CO—$CH_2CH_2$N(CO—$C_2H_5$)$CH_2CH_2$—CO—O$CH_2$—2 | —CN |
| 19 | 6-$CH_3$ | " | " | 3-$CH_2S(CH_2)_3SCH_2$—3 | " |
| 20 | " | " | " | " | —$COOC_2H_5$ |
| 21 | H | " | " | 2-$CH_2$O—CO—NH$(CH_2)_4$NH—CO—O$CH_2$—2 | —CN |
| 22 | 5-O$CH_3$ | " | " | 2-CH$(CH_3)OCH_2CH_2OCH_2CH_2$OCH$(CH_3)$—2 | " |
| 23 | 6-Cl | " | " | 3-$CH_2CH_2CH_2CH_2$—3 | —$COC_2H_5$ |
| 24 | H | " | —$CH_2CH_2OCH_3$ | 2-$CH_2CH_2SCH_2$—2 | —CN |
| 25 | H | " | —$CH_2CH_2$Cl | 2-$CH_2CH_2$O—CO—O$CH_2CH_2$—2 | " |
| 26 | H | " | —$C_2H_5$ | 2-O$CH_2$CH(OH)$CH_2$O—2 | " |
| 27 | H | " | " | 2-O$CH_2$CH(OCO—$CH_3$)$CH_2$O—2 | —CN |
| 28 | H | " | " | " | —$COOCH_3$ |
| 29 | H | —$CH_3$ | " | 2-O$CH_2$CHCl$CH_2$O—2 | " |
| 30 | H | —$C_2H_5$ | " | 2-O—$SO_2$—$(CH_2)_4$—$SO_2$—O—2 | —CN |
| 31 | H | " | " | 2-O—$SO_2$—N$(CH_3)$—$(CH_2)_3$N$(CH_3)$—$SO_2$—O—2 | " |
| 32 | H | " | " | 2-O—CO—N⌬N—CO—O— | " |
| 33 | H | " | " | 2—O$CH_2CH_2$O$CH_2CH_2$O—2 | " |
| 34 | H | " | " | 2-O$CH_2CH_2$N$(CH_3)$—CO—N$(CH_3)CH_2CH_2$O—2 | " |
| 35 | H | —$C_2H_5$ | —$C_2H_5$ | 2-O—CO—NH$CH_2CH_2$O$CH_2CH_2$NH—CO—O—2 | —CN |
| 36 | H | " | " | 2-N$(CH_3)$—CO—O$(CH_2)_6$O—CO—N$(CH_3)$—2 | " |
| 37 | H | " | " | 2-N$(CH_3)$—$SO_2$—$(CH_2)_4$—$SO_2$—N$(CH_3)$—2 | " |
| 38 | H | " | " | 2-N$(C_2H_5)$—CO—$(CH_2)_4$—CO—N$(C_2H_5)$—2 | " |
| 39 | H | " | " | 2-O—CO—O—$CH_2$C$(CH_3)_2CH_2$O—CO—O—2 | " |
| 40 | H | " | " | 2-NH—CO—O$CH_2$C$(CH_3)_2CH_2$O—CO—NH—2 | —$COOC_2H_5$ |
| 41 | H | " | " | 3-O—CO—NH$CH_2CH_2$O$CH_2CH_2$NH—CO—O—3 | " |

APPLICATION EXAMPLE A 10.0 Parts of the dyestuff produced in accordance with Example 1 are made into a paste with 9.3 parts of dinaphthylmethane disulphonic sodium and 18 parts of water, the mixture being ground using siliquartzite pearls until the average particle size is considerably below 1 $\mu$. After separating the paste from the siliquartzite pearls, 9.3 parts of a sodium-lignin sulphonate are added with stirring, and it is spray dried.

1.2 Parts of the dyeing preparation obtained as above are stirred with 1000 parts of water at 40° to 50°. 100 Parts of polyester fibre fabric are dyed therewith under pressure in a closed vessel for 1 hour at 130°. After cooling, rinsing, soaping, rinsing again and drying, a deep yellow even dyeing is obtained, which is of a high degree of purity and has notable fastness properties.

APPLICATION EXAMPLE B

An aqueous, finely-dispersed suspension consisting of 8 parts of the dyestuff produced in accordance with Example 1, 6 parts of dinaphthylmethane-disulphonic sodium, 6 parts of sulphite-cellulose-spent lye powder and 3 parts of sodium alginate are made up to 1000 parts by adding water and are mixed well. A polyester fabric is pad-dyed at 25° with the thus obtained padding liquor, dried by air at 100°–130° and subsequently treated with hot, dry air at 230° for 60 seconds. The fabric is then rinsed, soaped, rinsed again and dried. A greenish-yellow dyeing with notable fastness properties is obtained.

What is claimed is:

1. A compound of formula I,

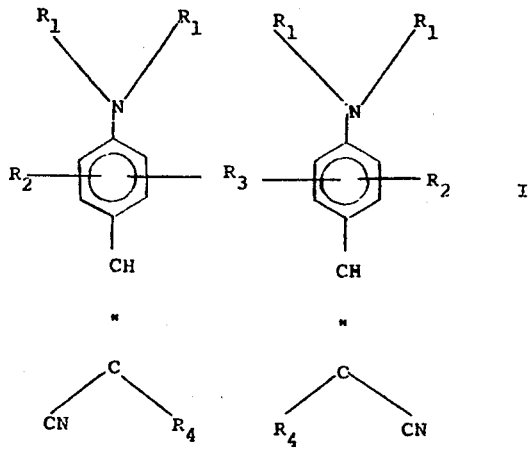

in which each
$R_1$, independently, signifies ($C_{1-6}$) alkyl which is unsubstituted or monosubstituted by halogen, cyano, hydroxyl, alkoxy, phenyl, phenoxy or acyloxy, each
$R_2$, independently, signifies hydrogen, halogen, ($C_{1-6}$) alkyl or ($C_{1-6}$) alkoxy, $R_3$ signifies a divalent radical of formula —$R_5$—$R_7$—$R_5$—$R_7$—$R_6$—$R_7$—$R_5$—$R_7$—$R_5$— or $R_5$—$R_7$—$R_6$—$R_7$—$R_5$— in which $R_6$ signifies a direct bond or a divalent radical of formula —O—, —S—, —$NR_9$—, —CO—, —O—CO—, —O—CO—O—, —$SO_2$—, —$NR_8$—CO—$NR_8$— or $NR_8$—$SO_2$—$NR_8$, $R_4$ signifies cyano or acyl, each $R_5$, independently, signifies a divalent radical of formula $-NR_8-CO-$, $-NR_8-CO-O-$, $-O-SO_2-$, $-NR_8-SO_2-$, $-O-SO_2-NR_8-$ or has one of the significances given for $R_6$, any unsymmetrical divalent radical as $R_5$ and $R_6$ being linked either way round, each $R_7$, independently, signifies $(C_{1-6})$ alkylene or alkylidene, of up to 6 carbon atoms which alkylene and alkylidene radicals are unsubstituted or monosubstituted by halogen, cyano, hydroxyl, $(C_{1-6})$ alkoxy, phenyl, phenoxy or acyloxy, each $R_8$, independently, signifies hydrogen, $(C_{1-6})$ alkyl or, when the chain contains any two $R_8$ attached to nitrogen atoms which are joined by an ethylene radical as $R_7$, the two symbols $R_8$, together with the nitrogen atoms and $R_7$ may join to form a piperazine ring, and $R_9$ signifies $(C_{1-6})$ alkylcarbonyl or $(C_{1-6})$ alkoxycarbonyl, any acyl group as $R_4$ or as part of an aryloxy group being of the formula $R-Y$ or $R'-Z$
in which
  $R$ signifies $(C_{1-6})$ alkyl,
  $Y$ signifies $-O-CO-$, $-SO_2-$ or $-O-SO_2-$,
  $R'$ signifies hydrogen or $(C_{1-6})$ alkyl and
  $Z$ signifies $-CO-$, $-NR'-CO-$ or $-NR'-SO_2-$ in which $R''$ has one of the significances of $R'$, which molecule is free from acetal groups.

2. A compound according to claim 1, in which each $R_1$, independently, signifies $(C_{1-4})$ alkyl or $(C_{1-4})$ alkyl monosubstituted by chlorine, bromine, hydroxy, $(C_{1-4})$ alkoxy, $(C_{1-4})$ alkylcarbonyloxy or $(C_{1-4})$ alkoxycarbonyloxy.

3. A compound according to claim 2, in which each $R_2$, independently, signifies hydrogen or $(C_{1-4})$ alkyl.

4. A compound according to claim 3, in which $R_6$ signifies a direct bond or $-O-$, $-S-$, $-NR_{9'}-$, $-O-CO-$ or $-O-CO-O-$ in which $R_{9'}$ signifies $(C_{1-4})$ alkylcarbonyl or $(C_{1-4})$ alkoxycarbonyl.

5. A compound according to claim 4, in which $R_5$, independently, signifies one of the significances given to $R_6$ in claim 4 or $-NR_{8'}$ $CO-$, $-NR_{8'}$ $CO-O-$, $-O-SO_2-$, $-NR_{8'}$ $SO_2-$ or $O-SO_2-NR_{8'}-$ in which each $R_{8'}$, independently, signifies hydrogen or $(C_{1-4})$ alkyl, or any two $R_8$'s, when attached to nitrogen atoms connected by an ethylene radical as $R_7$, together with nitrogen atoms and the ethylene radical, form a piperazine ring.

6. A compound according to claim 5, in which $R_7$ signifies an alkylene or alkylidene radical of up to 6 carbon atoms, unsubstituted or monosubstituted by hydroxy, chlorine, bromine, $(C_{1-4})$ alkoxy or $(C_{1-4})$ alkylcarbonyloxy.

7. A compound according to claim 6, in which $R_4$ signifies cyano or $(C_{1-4})$ alkoxycarbonyl.

8. A compound according to claim 1, in which the bridge member $R_3$ is symmetrical.

9. A compound according to claim 1, in which $R_3$ signifies a radical of formula $-R_{13}-R_{15}-R_{14}-R_{15}-R_{13}-$ or $-R_{16}-R_{14}-R_{16}-$ in which each $R_{13}$, independently, signifies an alkylene radical of up to 6 carbon atoms, $R_{14}$ signifies an alkylene radical of 2 to 6 carbon atoms or an alkylene radical of 2 to 6 carbon atoms containing an ether linkage, each $R_{15}$, independently, signifies $-O-$, $-O-CO-$, $-O-CO-O-$, $-CO-NR_{17}-$ or $-O-CO-NR_{17}-$, in which $R_{17}$ signifies hydrogen or $(C_{1-2})$ alkyl, each $R_{16}$, independently, signifies one of the significances given for $R_{15}$ or signifies $-O-SO_2-$, $-NR_{17}-SO_2-$ or $-O-SO_2-NR_{17}-$ in which $R_{17}$ is as defined above, any unsymmetrical divalent radical as $R_{15}$ or $R_{16}$ can be bonded either way round.

10. A compound according to claim 9, in which the two symbols $R_{13}$, $R_{15}$ and $R_{16}$ are the same.

11. A compound according to claim 1, in which each $R_1$, independently, signifies $(C_{1-4})$ alkyl or $(C_{1-4})$ alkyl monosubstituted by chlorine bromine, hydroxy, $(C_{1-4})$ alkoxy, $(C_{1-4})$ alkylcarbonyloxy or $(C_{1-4})$ alkoxycarbonyloxy, $R_2$ signifies hydrogen or $(C_{1-4})$ alkyl, $R_{3'}$ signifies $-R_{5'}-R_{7'}-R_{5'}-R_{7'}-R_{6'}-R_{7'}-R_{5'}-R_{7'}-R_{5'}-$ or $R_{5'}-R_{7'}-R_{6'}-R_{7'}-R_{5'}-$ $R_{4'}$ signifies cyano or $(C_{1-4})$ alkoxycarbonyl, $R_{6'}$ signifies a direct bond or $-O-$, $-S-$, $-NR_{9'}-$, $-O-CO-$ or $-O-CO-O$ in which $R_{9'}$ signifies $(C_{1-4})$ alkylcarbonyl or $(C_{1-4})$ alkoxycarbonyl, each $R_{5'}$, independently, signifies one of the significances given for $R_{6'}$, or $-NR_{8'}-CO-$, $-NR_{8'}-CO-O-$, $-O-SO_2-$, $NR_{8'}-SO_2-$ or $-O-SO_2-NR_{8'}-$ in which each $R_{8'}$, independently, signifies hydrogen or $(C_{1-4})$ alkyl or any two symbols $R_{8'}$, when attached to nitrogen atoms connected by an ethylene radical a $R_7$, together with the nitrogen atoms and the ethylene radical as $R_7$, signify a piperazine ring, and each $R_{7'}$, independently, signifies an alkylene or alkylidene radical which is unsubstituted or monosubstituted by hydroxy, chlorine, bromine, $(C_{1-4})$ alkoxy, or $(C_{1-4})$ alkylcarbonyloxy.

12. A compound according to claim 11, in which $R_3$ is symmetrical and $R_6$ is a direct bond.

13. A compound according to claim 11, in which $R_3$ is bound in a position ortho to the methine group.

14. A compound according to claim 9, of formula Ia,

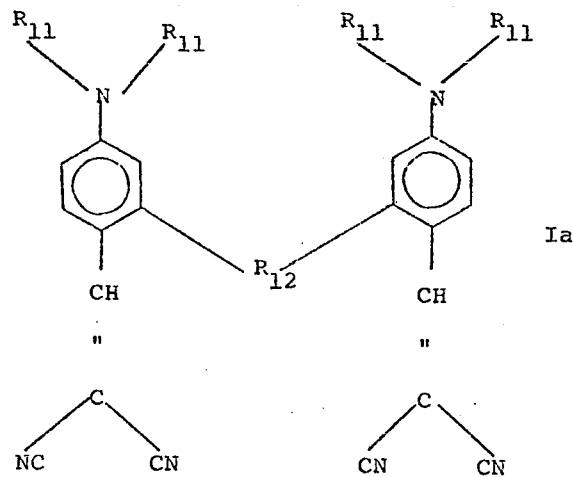

in which the symbols $R_{11}$ are the same and signify ($C_{2-4}$) alkyl, and, $R_{12}$ signifies —$R_{13}$—$R_{15}$—$R_{14}$—$R_{15}$—$R_{13}$— or —$R_{16}$—$R_{14}$—$R_{16}$— in which $R_{13}$ to $R_{16}$ are as defined in claim 9.

15. A compound according to claim 11 in which $R_1$ signifies ethyl, $R_2$ signifies hydrogen, $R_3$ signifies a 5 to 12 membered chain and $R_4$ signifies cyano.

16. A compound according to claim 14, in which $R_{11}$ signifies ethyl and $R_{12}$ signifies a 5 to 12 membered chain.

17. A compound according to claim 14, in which $R_{12}$ signifies —$CH_2$—X—($CH_2$)$_n$—X—$CH_2$— in which X signifies —O—CO— or O—CO—O and $n$ signifies 2, 4 or 6.

18. A compound according to claim 14 in which $R_{12}$ is symmetrical.

19. A compound according to claim 16, in which $R_{12}$ is symmetrical.

20. A compound according to claim 17, of formula

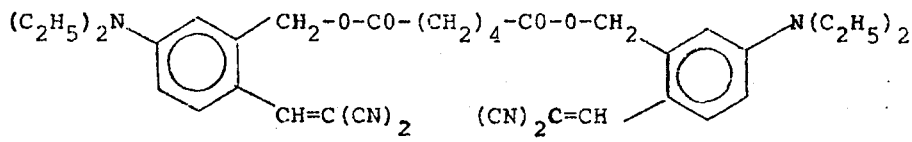

21. A compound according to claim 17, of formula

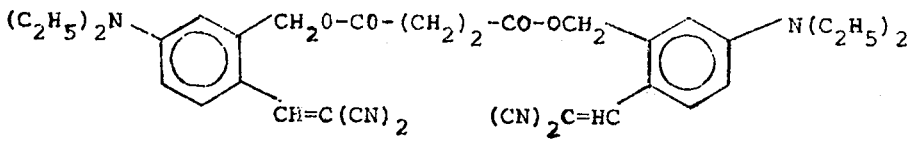

22. A compound according to claim 11, of formula

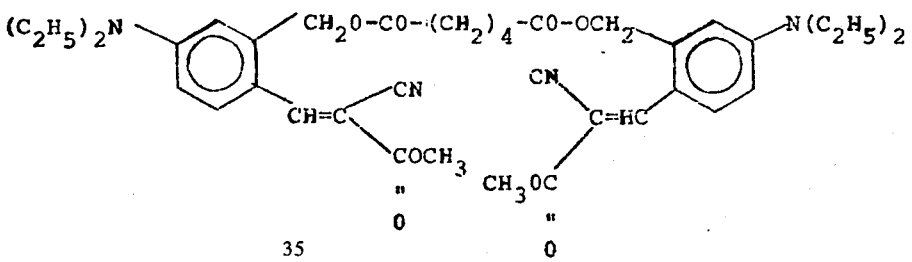

23. A compound according to claim 17, of formula

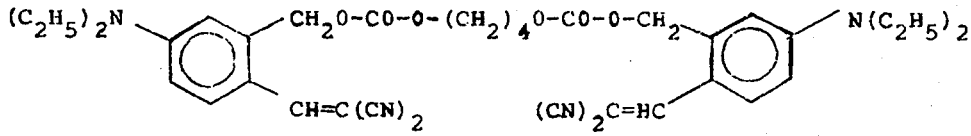

24. A compound according to claim 17, of formula

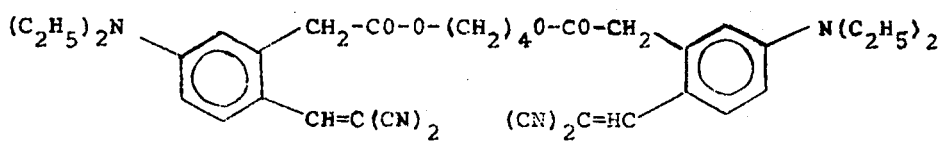

* * * * *